United States Patent
Hayashi

(10) Patent No.: US 9,221,497 B2
(45) Date of Patent: Dec. 29, 2015

(54) VEHICLE FRONT STRUCTURE

(71) Applicant: TOYOTA JIDOSHA KABUSHIKI KAISHA, Toyota-shi, Aichi-ken (JP)

(72) Inventor: Go Hayashi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/565,477

(22) Filed: Dec. 10, 2014

(65) Prior Publication Data
US 2015/0175215 A1    Jun. 25, 2015

(30) Foreign Application Priority Data
Dec. 19, 2013 (JP) .................. 2013-262939

(51) Int. Cl.
B62D 25/08 (2006.01)

(52) U.S. Cl.
CPC ............ B62D 25/088 (2013.01); B62D 25/082 (2013.01)

(58) Field of Classification Search
CPC ..... B62D 25/08; B62D 25/082; B62D 25/088
USPC ............... 296/187.09, 187.1, 193.11, 203.02
See application file for complete search history.

(56) References Cited

U.S. PATENT DOCUMENTS

| | | | | |
|---|---|---|---|---|
| 4,909,565 A * | 3/1990 | Harasaki | ............... | B62D 21/152 296/187.09 |
| 4,955,663 A * | 9/1990 | Imura | ................... | B62D 25/088 296/203.02 |
| 5,024,482 A * | 6/1991 | Isukimi | ..................... | B60G 7/00 280/124.125 |
| 5,031,958 A * | 7/1991 | Fujita | ................... | B62D 25/088 180/89.1 |
| 5,456,517 A * | 10/1995 | Kalian | ................ | B60G 15/068 164/47 |
| 7,052,076 B2 * | 5/2006 | Kim | ..................... | B62D 25/084 296/187.09 |
| 8,448,966 B2 * | 5/2013 | Rawlinson | ........... | B60G 15/067 280/124.134 |
| 8,720,983 B1 * | 5/2014 | Edwards | .............. | B62D 21/152 296/187.09 |
| 2006/0006699 A1 * | 1/2006 | Matsuyama | ......... | B62D 25/088 296/203.02 |
| 2010/0026047 A1 * | 2/2010 | Baccouche | .......... | B62D 21/152 296/187.09 |
| 2012/0205944 A1 * | 8/2012 | Kido | .................... | B62D 25/088 296/187.09 |
| 2012/0242111 A1 * | 9/2012 | Mildner | ............... | B62D 25/088 296/193.01 |
| 2015/0049072 A1 * | 2/2015 | Eggert | .................. | G09G 3/006 345/211 |
| 2015/0130223 A1 * | 5/2015 | Amemiya | ............ | B62D 25/088 296/193.09 |
| 2015/0166117 A1 * | 6/2015 | Ohoka | ................... | B23K 11/24 296/193.09 |
| 2015/0175215 A1 * | 6/2015 | Hayashi | ............... | B62D 25/082 296/187.09 |

FOREIGN PATENT DOCUMENTS

| | | |
|---|---|---|
| JP | 05-085414 A | 4/1993 |
| JP | 2008-087675 A | 4/2008 |

* cited by examiner

*Primary Examiner* — Gregory Blankenship
(74) *Attorney, Agent, or Firm* — Sughrue Mion, PLLC

(57) ABSTRACT

A front part of a vehicle is provided with front side members, upper members and suspension towers. Also, the suspension tower is provided with a first connecting portion being connected to the upper member, a second connecting portion being connected to the front side member, and a third connecting portion connected to the front side member while being positioned forward of the second connecting portion in the vehicle front-rear direction. The second connecting portion is connected to the front side member, a connecting strength between the front side member and the second connecting portion is lower than a connecting strength between the upper member and the first connecting portion. Also, the third connecting portion is connected to the front side member.

6 Claims, 3 Drawing Sheets

VEHICLE FRONT STRUCTURE

The disclosure of Japanese Patent Application No. 2013-262939 filed on Dec. 19, 2013 including the specification, drawings and abstract is incorporated herein by reference in its entirety.

BACKGROUND OF THE INVENTION

1. Field of the Invention

The invention relates to a vehicle front structure.

2. Description of Related Art

Japanese Patent Application Publication No. 5-85414 (JP 5-85414 A) discloses a vehicle front structure with secured collision energy absorbing performance upon frontal collision by securing crash stroke at the front part of a vehicle. The technology disclosed in this publication prevents the front wheels from contacting a side sill by bending a tie-rod and rotating the front wheels when frontal collision load is delivered to the front tires. Also, crash stroke is secured by preventing the front wheels from contacting the side sill, or increasing the distance of the front wheels up to the side sill. Further, in the vehicle front structure disclosed in JP 5-85414 A, a tie-rod bending member is formed on the side of the car body, thereby bending the tie-rod by contacting the tie-rod with the tie-rod bending member.

The vehicle front structure disclosed in JP 5-85414 A is a useful technology in that crash stroke can be secured on the front part of the vehicle, but it still needs to be improved from the perspective that the collision load input to the front wheels is supported by lockers.

SUMMARY OF THE INVENTION

The invention provides a vehicle front structure capable of supporting collision load input to front wheels by lockers.

The vehicle front structure according to one aspect of the invention includes a front side member in a vehicle front, the front side member extending in a vehicle front-rear direction; an upper member being provided on an outer side of the front side member in a vehicle width direction, the upper member extending in the vehicle front-rear direction; and a suspension tower being positioned between the front side member and the upper member wherein the suspension tower has a mounted portion mounting an arm which supports a front wheel positioned forward of a locker in the vehicle front-rear direction, the locker being positioned on a side of a vehicle floor and extending in the vehicle front-rear direction, the suspension tower has a first connecting portion connecting the upper member, the suspension tower has a second connecting portion being connected to the front side member, a connecting strength between the front side member and the second connecting portion being lower than a connecting strength between the upper member and the first connecting portion, and the suspension tower has a third connecting portion being positioned forward of the second connecting portion in the vehicle front-rear direction and the third connecting portion being connected to the front side member, the connecting strength between the front side member and the third connecting portion being lower than a connecting strength between the front side member and the second connecting portion.

According to the vehicle front structure, if frontal collision load is input to the front wheel, the load is delivered to the suspension tower through the arm. Also, if the load delivered to the suspension tower exceeds a predetermined value, the third connecting portion of the suspension tower is first peeled from the front side member or deformed. This causes the front wheel to rotate to one side when viewed from top of the vehicle, i.e., the front end of the front wheel to move to the outer side in the vehicle width direction. Thereafter, the second connecting portion of the suspension tower is peeled from the front side member or deformed. This causes the front wheel to rotate to the other side when viewed from top of the vehicle, i.e., the rear end of the front wheel to move to the outer side in the vehicle width direction. Accordingly, the change in rotation angle of the front wheel caused by having the third connecting portion of the suspension tower peeled from the front side member or deformed can be cancelled out with the change in rotation angle of the front wheel caused by having the second connecting portion of the suspension tower peeled from the front side member or deformed. Accordingly, the front wheel moving to the rear part of the vehicle by the collision load input can be contacted with the front end of the locker.

The vehicle front structure according to another aspect of the invention includes a front side member in a vehicle front, the front side member extending in a vehicle front-rear direction; an upper member being provided on an outer side of the front side member in a vehicle width direction and extending in the vehicle front-rear direction; and a suspension tower being positioned between the front side member and the upper member wherein the suspension tower has a mounted portion mounting an arm which supports a front wheel positioned forward of a locker in the vehicle front-rear direction, the locker positioned on a side of a vehicle floor and extends in the vehicle front-rear direction, the suspension tower has a first connecting portion being connected to the upper member, the suspension tower has a second connecting portion being connected to the front side member, and the suspension tower has a third connecting portion being positioned forward of the second connecting portion in the vehicle front-rear direction and the third connecting portion being connected to the front side member, and wherein a stiffness of the first connecting portion of the suspension tower is set to be higher than a stiffness of the second connecting portion of the suspension tower, and the stiffness of the second connecting portion of the suspension tower is set to be higher than a stiffness of the third connecting portion of the suspension tower.

According to the vehicle front structure, if frontal collision load is input to the front wheel, the load is delivered to the suspension tower through the arm. Also, if the load delivered to the suspension tower exceeds a predetermined value, the area of the third connecting portion of the suspension tower is first deformed. This causes the front wheel to rotate to one side when viewed from top of the vehicle, i.e., the front end of the front wheel to move to the outer side in the vehicle width direction. Thereafter, the area of the second connecting portion of the suspension tower is deformed. This causes the front wheel to rotate to the other side when viewed from top of the vehicle, i.e., the rear end of the front wheel to move to the outer side in the vehicle width direction. Accordingly, the change in rotation angle of the front wheel caused by having the area of the third connecting portion of the suspension tower deformed can be cancelled out with the change in rotation angle of the front wheel caused by having the area of the second connecting portion of the suspension tower deformed. Accordingly, the front wheel moving to the rear part of vehicle by the collision load input can be contacted with the front end of the lockers.

The vehicle front structure may be configured such that the connecting strengths of the first connecting portion, the second connecting portion, and the third connecting portion are adjusted by a number of welding points.

The vehicle front structure may be configured such that the connecting strengths of the first connecting portion, the second connecting portion, and the third connecting portion are adjusted by a region of laser welding.

According to the vehicle front structure, the connecting strengths of the first connecting portion, the second connecting portion and the third connecting portion can be easily adjusted.

The vehicle front structure has an excellent effect of being capable of supporting collision load input to a front wheel by a locker.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiment 1

The vehicle front structure in accordant with Embodiment 1 is described with reference to FIG. 1 and FIG. 2. The front side in a vehicle front-rear direction is indicated by arrow FR, the outer side in the vehicle width direction is indicated by arrow OUT, and the upper side in a vehicle up and down direction is indicated by arrow UP. Also, in the following description, when simply indicating the front and rear direction and the up and down direction, the directions are intended to mean the forward and backward direction in the vehicle front-rear direction and the up and down direction in the vehicle up and down direction.

Figure 1:
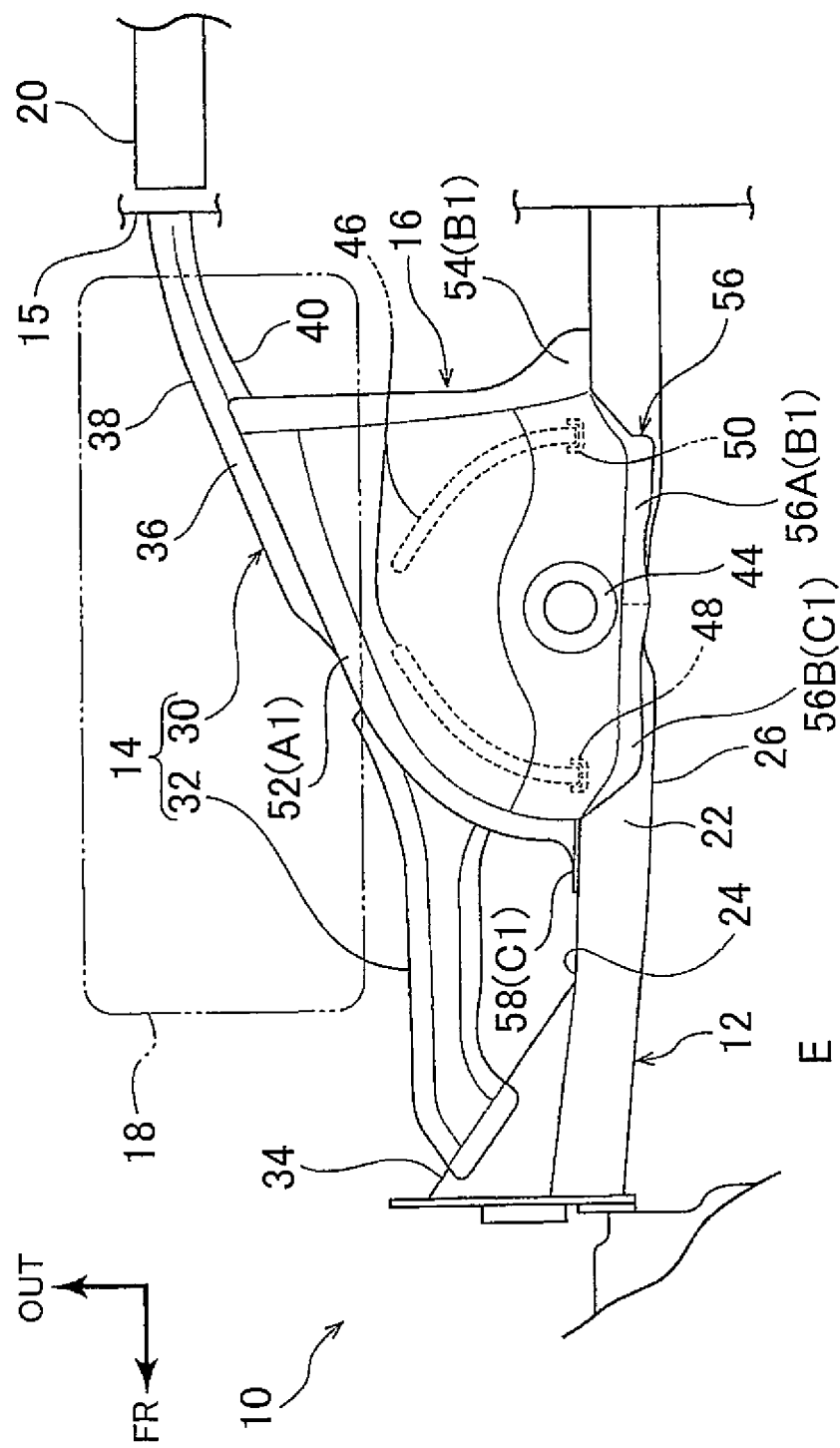
FIG. 1 is a plan view illustrating one side of a front part of a vehicle in a vehicle width direction in accordance with Embodiment 1.
Figure 2:
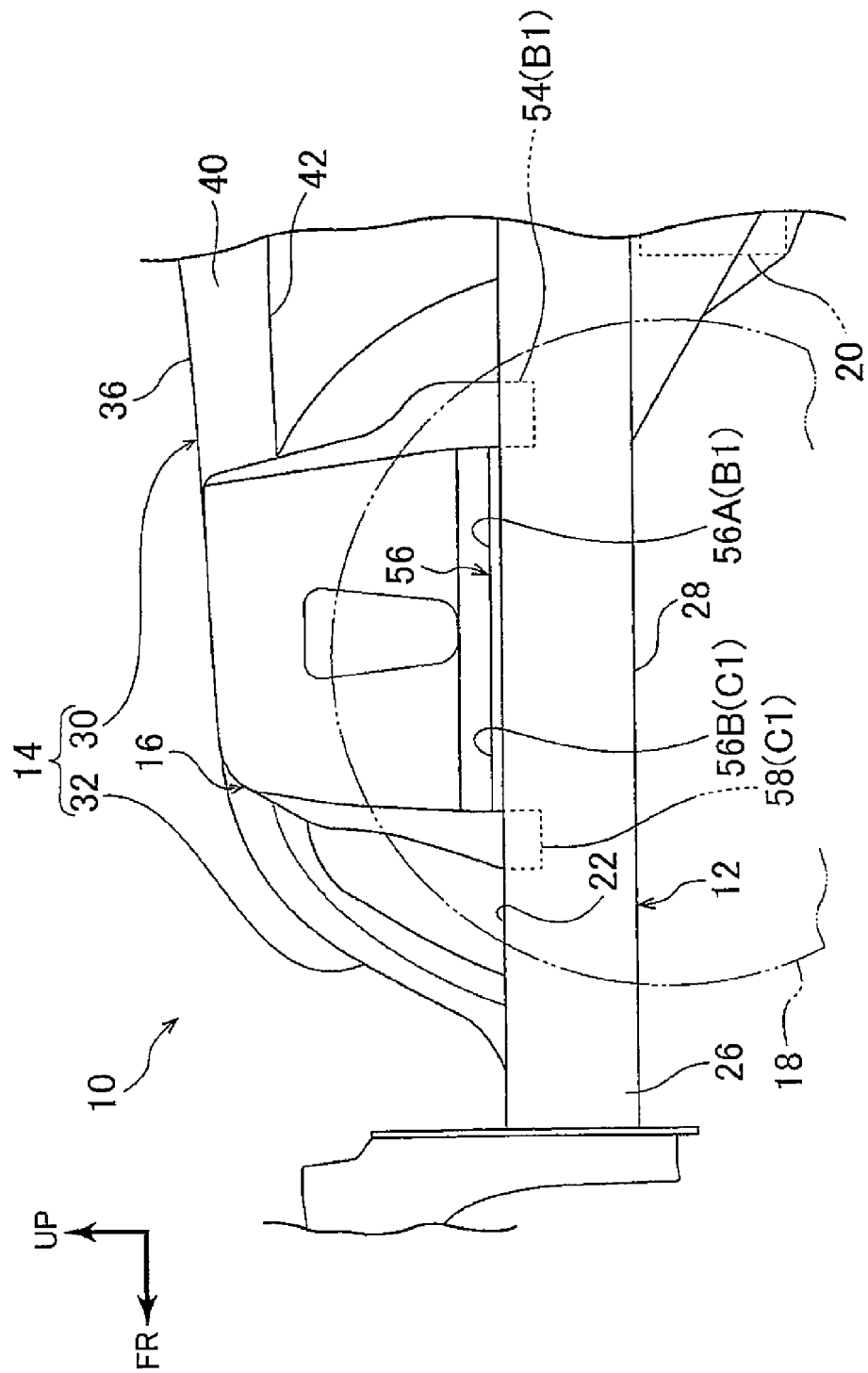
FIG. 2 is a side view illustrating the one side of the front part of the vehicle in the vehicle width direction in accordance with Embodiment 1, viewed from the engine room.

As illustrated in FIG. 1 and FIG. 2, the front part (10) of the vehicle to which the vehicle front structure of the present embodiment is applied is provided with a pair of front side members (12) arranged at intervals in the vehicle width direction, upper members (14) arranged on the outer side of the front side members in the vehicle width direction, and suspension towers (16) formed between the front side members (12) and upper members (14). Also, the front part (10) of vehicle is provided with a pair of front wheels (18) on the left and right side, and the front wheels (18) are arranged in front of lockers (20) in the vehicle front-rear direction, and the lockers are arranged at both sides of the vehicle floor and extended in the vehicle front-rear direction.

(Front side member (12)) The front side member (12) is formed such that its cross section when viewed from top of the vehicle is a rectangular shape while being arranged between the left and right front wheels (18) and extended in the vehicle front-rear direction. To be specific, a part of the front side member (12) placed within the engine room (E) is composed of a top wall part (22) whose thickness is shown in the vehicle up and down direction and which extends in the vehicle front-rear direction, side wall parts (24, 26) which respectively extends downward in the vehicle up and down direction from both ends of the top wall part (22) in the vehicle width direction, and a bottom wall part (28) connecting the lower end of the side wall part (24) and the lower end of the side wall part (26) in the vehicle width direction.

(Upper member (14)) The upper member (14) is formed such that its cross section when viewed from front of the vehicle is a rectangular shape, the upper member (14) being extended in the vehicle front-rear direction. The upper member (14) is composed of a first extending part (30) and a second extending part (32), the first extending part (30) being connected at its rear end to the front pillar (15), the first extending part (30) being placed above the front side member (12) when viewed from the side of the vehicle, the second extending part (32) being connected at its front end to the front end of the front side member (12) via a gusset (34), the second extending part (32) being extended downward with an inclination in the vehicle up and down direction from the front end of the first extending part (30). The first extending part (30) is composed of a top wall part (36), side wall parts (38, 40) and a bottom wall part (42), the thickness direction of the top wall part (36) is coincident with the vehicle up and down direction and the top wall part (36) extending in the front-rear direction, the side wall parts (38, 40) respectively extending downward in the vehicle up and down direction from both ends of the top wall part (36) in the vehicle width direction, the bottom wall part (42) connecting the lower end of the side wall part (38) and the lower end of the side wall part (40) in the vehicle width direction.

(Suspension tower (16)) The suspension tower (16) is formed by press processing, etc. a steel plate material, and the suspension tower (16) is formed in a convex shape protruding to the engine room (E) side. To be specific, the suspension tower (16) includes a coilover supporting part (44) to which the upper end part of a shock absorber is fixed, the shock absorber constituting a part of the coilover which is not illustrated. Also, a front mounted portion (48) and a rear mounted portion (50) are respectively formed as mounted portions mounted with upper arms (46) as arms on the front and rear end of the coilover supporting part (44) of the suspension tower (16). The front wheels (18) are to be supported on the vehicle body by hubs, knuckle arms, lower arms, which are not illustrated, and upper arms (46), etc.

Also, the suspension tower (16) includes a first flange part (52) connected to the top wall part (36) of the first extending part (30) of the upper member (14), a second flange part (54) connected to the side wall part (24) of the front side member (12), a third flange part (56) connected to the top wall part (22) of the front side member (12), and a fourth flange part (58) positioned forward of the second flange part (54) and the third flange part (56), the fourth flange part (58) being connected to the side wall part (24) of the front side member (12).

Here, if the first flange part (52) is referred to as the first connecting portion (A1), the second flange part (54) and an area (56A) of the rear side of vehicle of the third flange part (56) are referred to as the second connecting portion (B1), an area (56B) of the front side of the vehicle of the third flange part (56) and the fourth flange part (58) are referred to as the third connecting portion (C1), the second connecting portion (B1) is connected to the front side member (12), the connecting strength between the front side member (12) and the second connecting portion (B1) being lower than the connecting strength between the upper member (14) and the first connecting portion (A1). Also, the third connecting portion (C1) is connected to the front side member (12), the connecting strength between the front side member (12) and the third connecting portion (C1) being lower than the connecting strength between the front side member (12) and the second connecting portion (B1). Further, the connecting strengths of the first connecting portion (A1), second connecting portion (B1) and third connecting portion (C1) to the upper member (14) or front side member (12) are adjusted by the region of laser welding, interval of spot welding points, interval of rivet, etc.

Action and Effect of the Present Embodiment

Next, the action and effect of the present embodiment will be described.

According to the vehicle front structure of the present embodiment, if frontal collision load is input to the front wheel (18), the load is delivered to the suspension tower (16) through the upper arms (46). Also, if the load delivered to the suspension tower (16) exceeds a predetermined value, the third connecting portions (C1) of the suspension tower are first peeled from the front side member (12) or deformed. This causes the front wheel (18) to rotate to one side when viewed from top of the vehicle, i.e., the front end of the front wheel to move to the outer side in a vehicle width direction. Thereafter, the second connecting portions (B1) of the suspension tower (16) are peeled from the front side member (12) or deformed. This causes the front wheel (18) to rotate to the other side when viewed from top of the vehicle, i.e., the rear end of the front wheel (18) to move to the outer side in the vehicle width direction. Accordingly, the change in rotation angle of the front wheel (18) caused by having the third connecting portions (C1) of the suspension tower peeled from the front side member (12) or deformed can be cancelled out with the change in rotation angle of the front wheel caused by having the second connecting portions (B1) of the suspension tower (16) peeled from the front side member or deformed. Accordingly, the front wheel (18) moving to the rear side of the vehicle by the collision load input can be contacted with the front end of the locker (20). That is, in the present embodiment, the floor of the vehicle body can be subjected to the collision load input into the front wheel (18).

Embodiment 2

The vehicle front structure in accordance with Embodiment 2 will be described with reference to FIG. 3. Also, with respect to the same members and parts having the same functions as Embodiment 1, reference numerals the same as those of embodiment 1 are used, and explanation in this regard is omitted.

Figure 3:
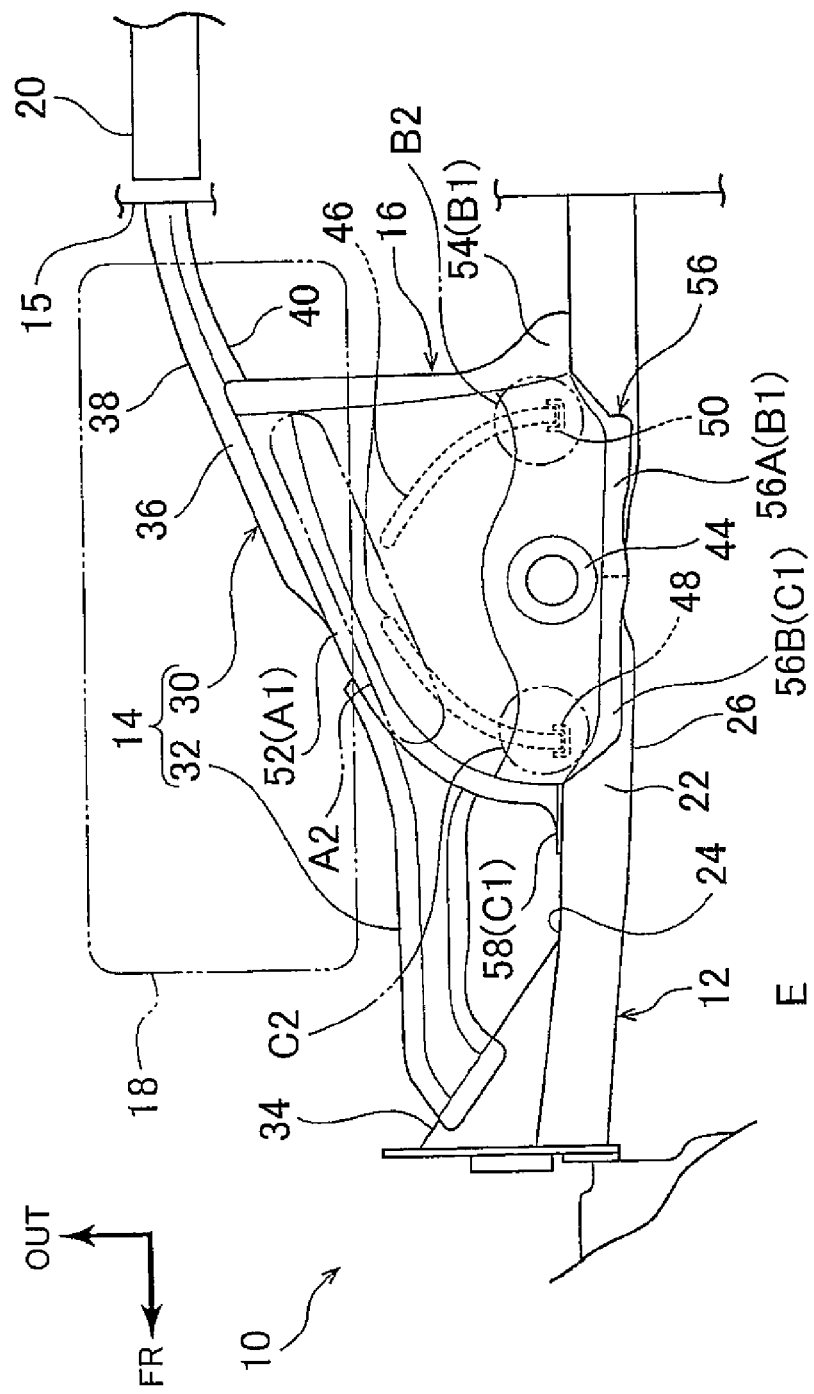
FIG. 3 is a plan view corresponding to FIG. 1, illustrating one side of a front part of a vehicle in a vehicle width direction in accordance with Embodiment 2.

As illustrated in FIG. 3, the vehicle front structure of the present embodiment is characterized in that the stiffness at the first connecting portion (A1) of the suspension tower (16) (stiffness of the area surrounded by the two-dot chain line A2) is set to be higher than the stiffness at the second connecting portion (B1) of the suspension tower (16) (stiffness of the area surrounded by the two-dot chain line B2), and that the stiffness at the second connecting portion (B1) of the suspension tower (16) is set to be higher than the stiffness at the third connecting portion (C1) of the suspension tower (16) (stiffness of the area surrounded by the two-dot chain line C2). Also, the stiffness at each part of the suspension tower (16) is adjusted by having beads or lightening holes, etc. formed at the suspension tower (16).

According to the vehicle front structure of the present embodiment, if frontal collision load delivered to the suspension tower (16) exceeds a predetermined value, the area of the third connecting portions (C1) of the suspension tower (16) is first deformed. This causes the front wheel (18) to rotate to one side when viewed from top of the vehicle. Thereafter, the area of the second connecting portions (B1) of the suspension tower (16) is deformed. This causes the front wheel (18) to rotate to the other side when viewed from top of the vehicle. Accordingly, the change in rotation angle of the front wheel caused by having the area of the third connecting portions (C1) of the suspension tower (16) deformed can be cancelled out with the change in rotation angle of the front wheel caused by having the area of the second connecting portions (B1) of the suspension tower (16) deformed. Accordingly, the front wheel (18) moving to the rear side of the vehicle by the collision load input can be contacted with the front end of the locker (20). That is, in the embodiment, the floor of the vehicle body can be subjected to the collision load input into the front wheel (18).

The embodiments of the invention have been described so far, but the invention is not limited to the embodiments and can be carried out in various modifications without deviating from the spirit and scope of the invention.

What is claimed is:

1. A vehicle front structure comprising:
a front side member in a vehicle front, the front side member extending in a vehicle front-rear direction;
an upper member being provided on an outer side of the front side member in a vehicle width direction, the upper member extending in the vehicle front-rear direction; and
a suspension tower being positioned between the front side member and the upper member, the suspension tower including:
a mounted portion mounting an arm which supports a front wheel positioned forward of a locker in the vehicle front-rear direction, the locker being positioned on a side of a vehicle floor, the locker extending in the vehicle front-rear direction;
a first connecting portion being connected to the upper member;
a second connecting portion being connected to the front side member, a connecting strength between the front side member and the second connecting portion being lower than a connecting strength between the upper member and the first connecting portion; and
a third connecting portion being positioned forward of the second connecting portion in the vehicle front-rear direction, the third connecting portion being connected to the front side member, a connecting strength between the front side member and the third connecting portion being lower than the connecting strength between the front side member and the second connecting portion.

2. The vehicle front structure according to claim 1, wherein connecting strengths of the first connecting portion, the second connecting portion, and the third connecting portion are adjusted by the number of welding points.

3. The vehicle front structure according to claim 1, wherein connecting strengths of the first connecting portion, the second connecting portion, and the third connecting portion are adjusted by a region of laser welding.

4. A vehicle front structure comprising:
a front side member in a vehicle front, the front side member extending in a vehicle front-rear direction;
an upper member being provided on an outer side of the front side member in a vehicle width direction, the upper member extending in the vehicle front-rear direction; and a suspension tower being positioned between the front side member and the upper member, the suspension tower including:
- a mounted portion mounting an arm which supports a front wheel positioned forward of a locker in the vehicle front-rear direction, the locker being positioned on a side of a vehicle floor, the locker extending in the vehicle front-rear direction;
- a first connecting portion being connected to the upper member;
- a second connecting portion being connected to the front side member; and
- a third connecting portion being positioned forward of the second connecting portion in the vehicle front-rear direction, the third connecting portion being connected to the front side member,
- wherein a stiffness of the first connecting portion of the suspension tower is set to be higher than a stiffness of the second connecting portion of the suspension tower, and the stiffness of the second connecting portion of the suspension tower is set to be higher than a stiffness of the third connecting portion of the suspension tower.

5. The vehicle front structure according to claim 4, wherein connecting strengths of the first connecting portion, the second connecting portion, and the third connecting portion are adjusted by the number of welding points.

6. The vehicle front structure according to claim 4, wherein connecting strengths of the first connecting portion, the second connecting portion, and the third connecting portion are adjusted by a region of laser welding.

* * * * *